(12) United States Patent
Hsu

(10) Patent No.: US 6,655,203 B2
(45) Date of Patent: Dec. 2, 2003

(54) TIRE-CONDITION SENSOR HAVING POSITIONING BOLTS FOR ADJUSTABLY POSITIONING THE SENSOR IN A FIXED POSITION ON A WHEEL RIM OF A PNEUMATIC TIRE

(75) Inventor: Charles Hsu, Kaohsiung (TW)

(73) Assignee: Lite-On Automotive Corp., Kaoshiung (TW)

( * ) Notice: Subject to any disclaimer, the term of this patent is extended or adjusted under 35 U.S.C. 154(b) by 0 days.

(21) Appl. No.: 10/184,925

(22) Filed: Jul. 1, 2002

(65) Prior Publication Data

US 2003/0126919 A1 Jul. 10, 2003

(30) Foreign Application Priority Data

Jan. 9, 2002 (TW) ........................................ 91200174 U

(51) Int. Cl.$^7$ ............................................... B60C 23/02
(52) U.S. Cl. ...................................................... 73/146.8
(58) Field of Search ............................. 73/146.2, 146.3, 73/146.9, 146.8; 340/442, 443, 445; 152/152.1; 116/30

(56) References Cited

U.S. PATENT DOCUMENTS

| | | |
|---|---|---|
| 4,048,614 A | 9/1977 | Shumway .................... 340/58 |
| 5,844,131 A | 12/1998 | Gabelmann et al. ....... 73/146.8 |
| 6,055,855 A | 5/2000 | Straub ....................... 73/146.8 |

*Primary Examiner*—William Oen
(74) *Attorney, Agent, or Firm*—Lowe Hauptman Gidman & Berner LLP

(57) ABSTRACT

A tire-condition sensor installed on a wheel rim, which defines a wheel rim platform and a valve hole, of a tire includes a valve rod, a main body, and two positioning bolts. The valve rod extends from one side wall of the main body and passes through the valve hole for fixing the sensor on the wheel rim. The main body has a top surface and a bottom surface. The two positioning bolts adjustably extend from the bottom surface of the main body and rest on the wheel rim platform for supporting the main body on the wheel rim platform such that the tire-condition sensor is fixedly positioned on the wheel rim.

20 Claims, 3 Drawing Sheets

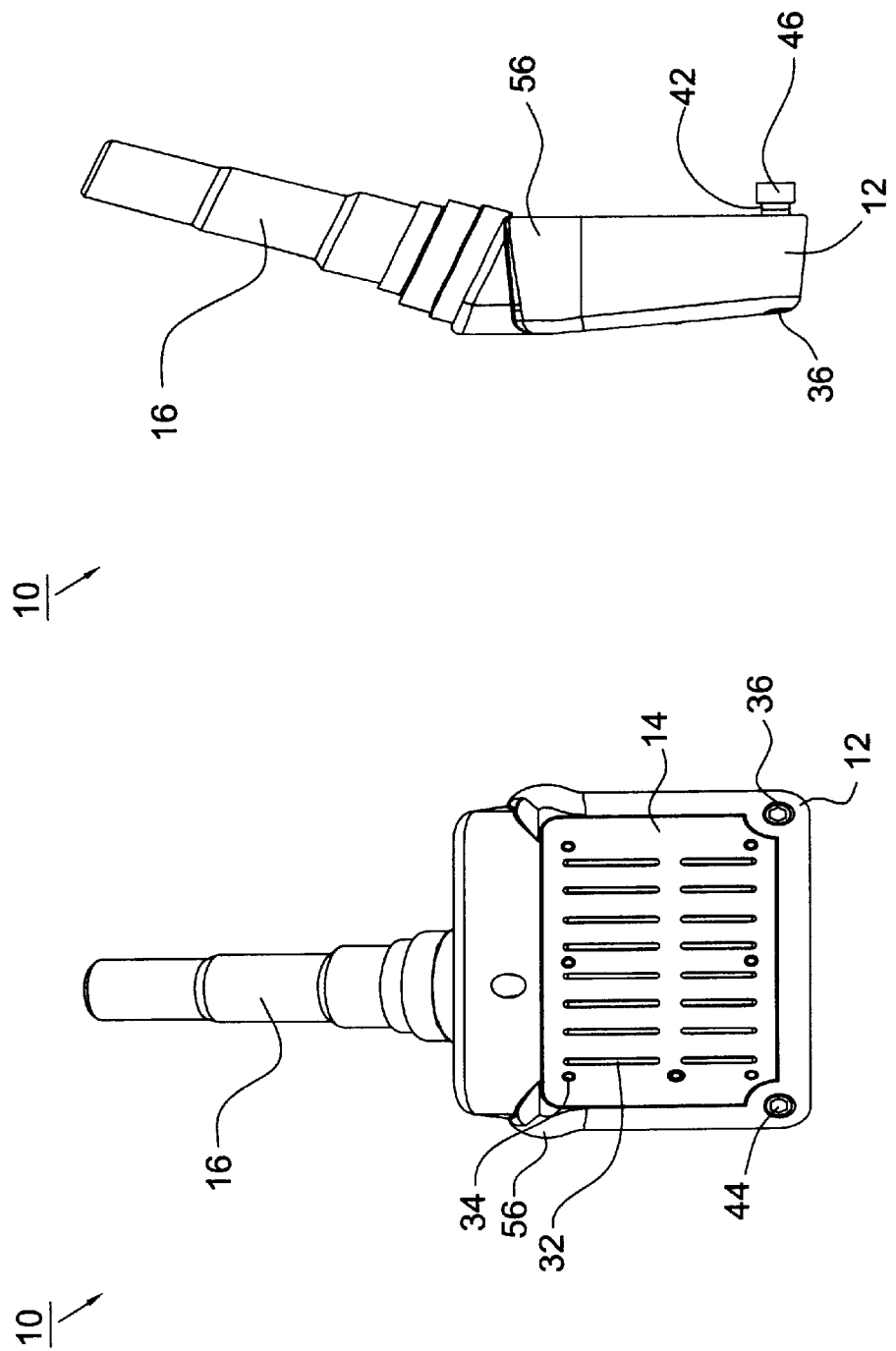

TIRE-CONDITION SENSOR HAVING POSITIONING BOLTS FOR ADJUSTABLY POSITIONING THE SENSOR IN A FIXED POSITION ON A WHEEL RIM OF A PNEUMATIC TIRE

CROSS REFERENCE

This application claims priority from Taiwan Patent Application No. 91200174 filed Jan. 9, 2002.

FIELD OF THE INVENTION

The invention relates to a tire-condition sensor of a pneumatic tire, and more particularly, to a tire-condition sensor, of a pneumatic tire, that is firmly attached to the wheel rim by the use of a valve hole of the tire.

BACKGROUND OF THE INVENTION

There are many sensing apparatuses for monitoring tire pressure in the prior art for a pneumatic tire vehicle. For example, a U.S. Pat. No. 4,048,614 "Low Tire Pressure Warning Device" granted to Shumway et al. on Sep. 13, 1977 discloses a tire-condition warning system that, being installed on the wheel rim, includes a wireless transmitter for actuating, a power source, a switch, and a diaphragm. The warning system can trigger the wireless transmitter to provide driver with warning signal when the tire pressure is lower than a predetermined pressure value. But the above-mentioned warning apparatus can only provide warning signal when the vehicle has excessive low tire pressure. Besides, the constituted members of the warning apparatus is rather complicated, thereby, the warning apparatus is not applicable to the modern vehicles.

Another U.S. Pat. No. 5,844,131 "Tire Pressure Sensor Apparatus for a Pneumatic Tire Vehicle" granted to Gabelmann et al. on Dec. 1, 1998 discloses a tire pressure sensing apparatus. The sensing apparatus includes a housing having at least two base seat members for placing the apparatus on the wheel rim platform and adjustably supporting the housing to be fixed in place by acting together with a wheel valve rod.

Still another U.S. Pat. No. 6,055,855 "Tire Pressure Sensor Wheel Attachment Apparatus" granted to Straub et al. on May 2, 2000 discloses an apparatus for fixing on the wheel rim of a vehicle. The apparatus possesses a pressure sensor fixing on the wheel rim by threaded connection with a tire valve rod.

In addition, U.S. patent application Ser. No. 09/910,725 filed on Jul. 24, 2001 (corresponding to Taiwan (R.O.C.) Patent application number 089,117,036 entitled "A Method and an Apparatus for Monitoring Pneumatic Tire Pressure") discloses a sensor module, attached to a pneumatic tire, for sensing the tire pressure and transmitting the signals obtained from the tire pressure wirelessly. Moreover, U.S. patent application Ser. No. 09/941,567 filed on Aug. 30, 2001 (corresponding to Taiwan (R.O.C.) Patent application number 089,118,096 entitled "Tire Condition Sensor of Pneumatic Tire of a Vehicle") discloses a tire pressure sensor attached to a pneumatic tire. These two US applications are incorporated herein by reference in their entirety.

However, the sensor of the aforementioned prior arts is not able to attach firmly to the wheel rim of the tire, and the tire-condition sensor oftentimes drops while the vehicle bumps along an uneven road.

To resolve the above-mentioned problems, it becomes necessary to provide a wheel rim having the sensor firmly fixed in order that the tire condition can be monitored constantly and worked normally.

SUMMARY OF THE INVENTION

In the light of the above-mentioned disadvantages, an objective of the invention is to provide a tire-condition sensor that can be firmly fixed on the wheel rim of a wheel and can be interacted with a receiver in order to monitor the service condition of the tire.

Another objective of the invention is to provide a tire-condition sensor that has an antenna device disposed along the surface of the sensor for reducing the chances of damaging the antenna.

To attain the above-mentioned objectives, the invention provides a tire-condition sensor for installing on a wheel rim of a tire. The wheel rim defines a wheel rim platform and a valve rod. The tire-condition sensor includes a valve rod, a main body, and two positioning devices. The valve rod is for passing through the valve hole and being fixed on the wheel rim. The main body has a sensor for sensing the condition of the tire, connecting to the valve rod, and defining a positioning direction which is more or less perpendicular to the wheel rim platform. The two positioning devices, positioning on the main body, can move in the positioned direction relative to the main body, adjustably touch the wheel rim platform, and by means of this to firmly fix the tire-condition sensor.

In one aspect of the invention, the tire-condition sensor includes also an antenna disposed along an upper plane defined by the main body, an outer lid for protecting the antenna, and a multiplicity of slots for exposing the antenna.

In other aspect of the invention, the positioning device of the tire-condition sensor is the two-bolt. The main body has also two threaded holes each hole matches with one of two bolts respectively, thereby, it can adjustably touch the wheel rim platform of the wheel rim.

Still another aspect of the invention, the main body of the tire-condition sensor has also two protuberances at both sides thereof to protect the tire-condition sensor.

According to the above-mentioned statements, the tire-condition sensor of the invention has two adjustable bolts that act together with the valve rod so as to make the tire-condition sensor firmly fix to the wheel rim platform. Moreover, the tire-condition sensor includes also a low-profile antenna and the protuberances that can prevent the tire-condition sensor from being damaged by the tools while it is performed maintenance.

In order to make the foregoing and other objectives, characteristics, and advantages of the invention more significant and easy to understand, preferred embodiments with accompanied figures will be illustrated as follows:

BRIEF DESCRIPTION OF THE DRAWING

FIG. 2 is a plan view of the tire-condition sensor of FIG. 1.

FIG. 3 is a side view of the tire-condition sensor of FIG. 1.

DETAILED DESCRIPTION OF THE EMBODIMENTS

Figure 1:
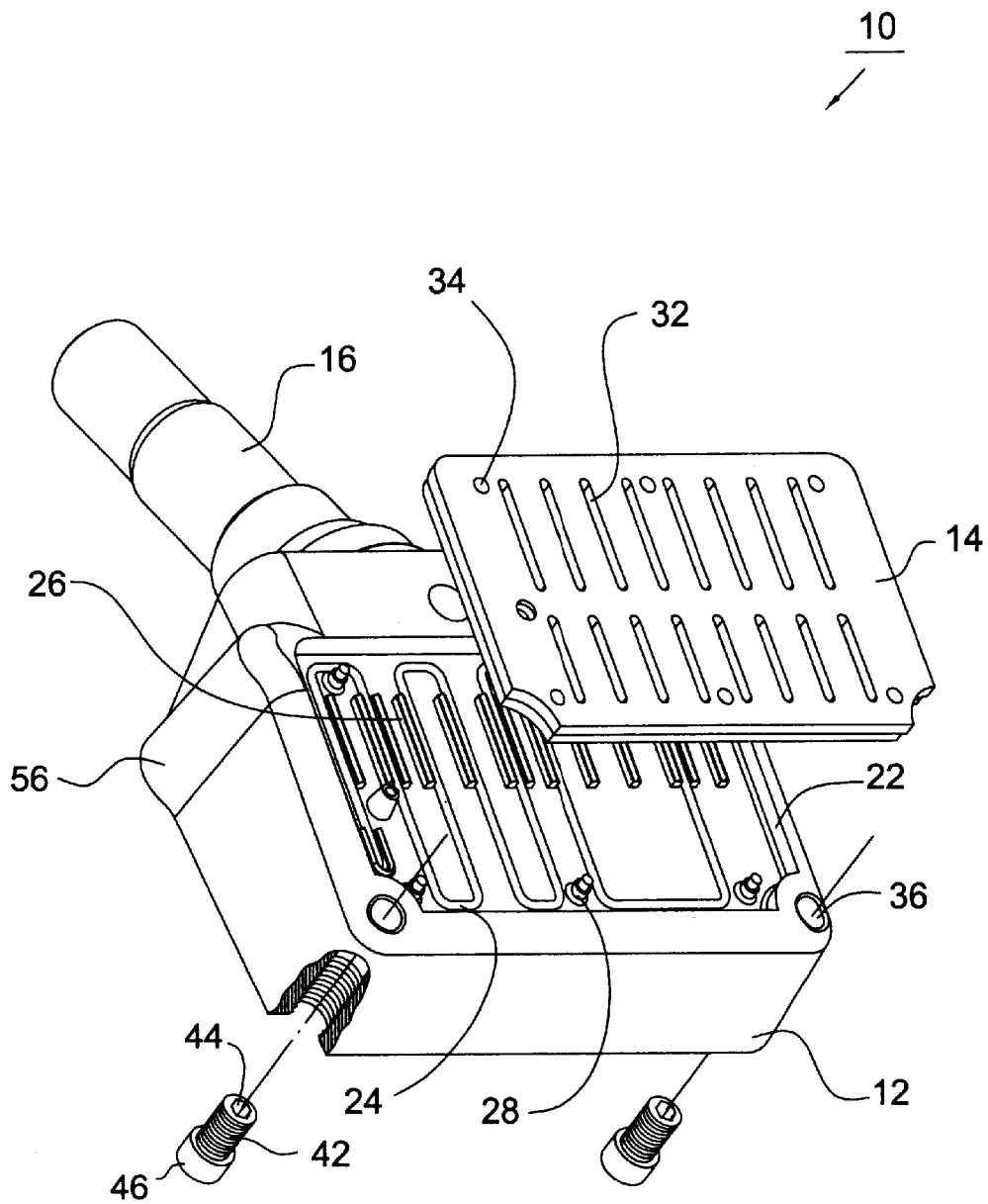
FIG. 1 is an exploded view of a portion of tire-condition sensor of the preferred embodiment of the invention.

FIG. 1, FIG. 2 and FIG. 3 show the tire-condition sensor 10 of the preferred embodiment of the invention. The tire-condition sensor 10 includes a main body 12, an outer lid 14, and a valve rod 16.

The main body 12 has an inner space for containing the tire-condition apparatus (not shown in the figure). The tire-condition apparatus includes an ASIC (Sensor Application-Specific Integrated Circuit) for sensing pressure and temperature of a power source like a battery, and a RF (Radio Frequency) transmitter used for transferring the signals, that are obtained from sensing the tire-condition, into RF signals to be transmitted.

Persons familiar with the art can understand that a receiver installed in a vehicle can receive the RF signals transmitting off in order to monitor the conditions of the tire.

Moreover, there is also a space 22 between the main body 12 and the outer lid 14 for containing an antenna 24 of the RF transmitter. As shown in FIG. 1, the antenna is disposed in the space 22 i.e., the antenna is disposed along an upper surface defined by the main body 12 and is fixed by positioning fasteners 26. Persons versed in the art can understand that the dimension of the antenna 24 such as the length, the diameter, and the outward appearance of the layout can be changed in accordance with the characteristics of the RF transmitter. Moreover, the outer lid 14 has a multiplicity of slots 32 for exposing the antenna 24 in order to enhance the electrical characteristics of the antenna. The main body 12 has also a multiplicity of positioning pins 28 that can act together with their matching holes 34 on the outer lid 14 to hold the outer lid 14 in right position. Besides, the outer lid 14 can be fixed to the main body 12 by various types of fixing means such as bolts, welding, and adhesion etc.

Figure 4:
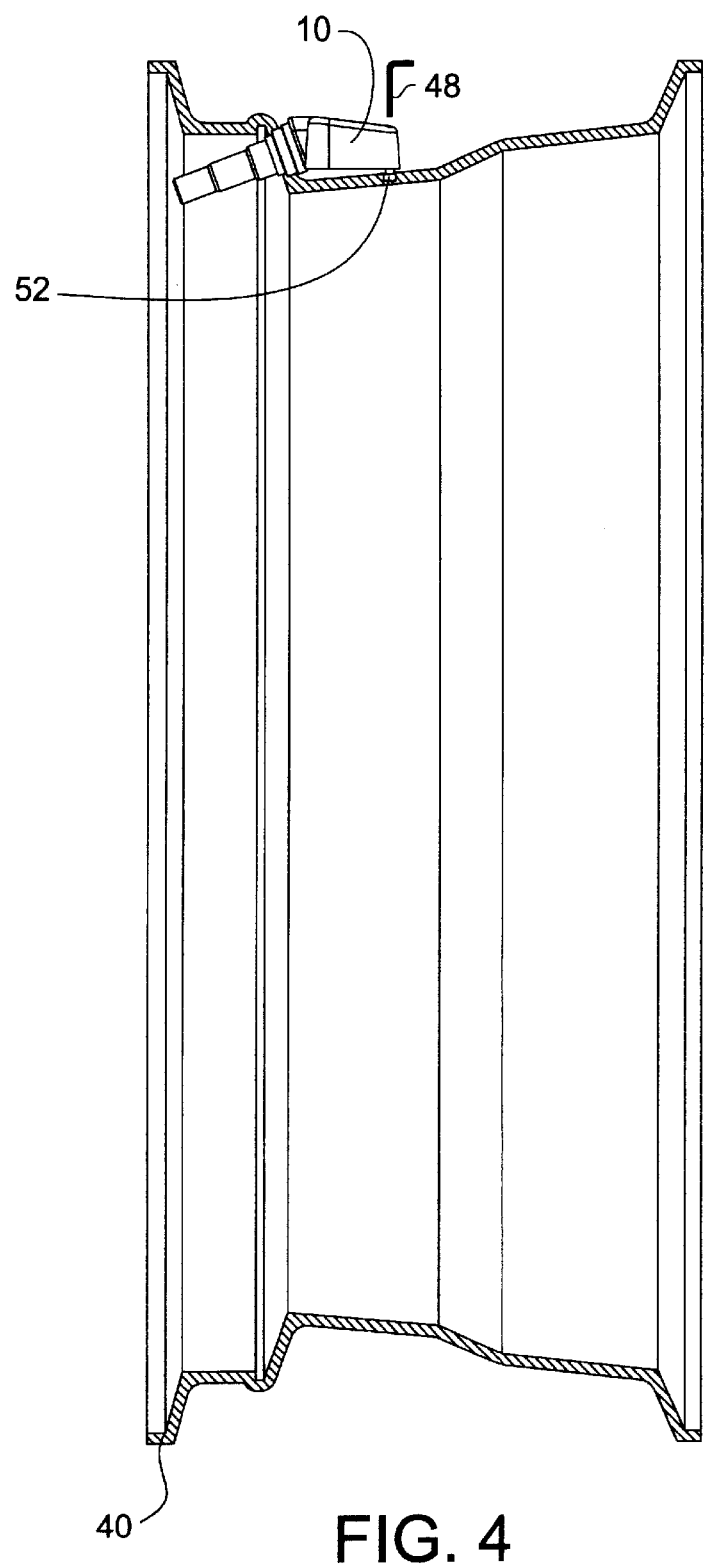
FIG. 4 is a schematic cross-sectional view of the tire-condition sensor attaching on a wheel rim of FIG. 1.

As shown in FIG. 1, FIG. 3 and FIG. 4, the main body 12 of the tire-condition sensor 10 has two positioning members such as bolts 42 and threaded holes 36 for fixedly positioning the sensor 10 on a wheel rim 40. The bolt 42 has bolt head 46 and an inner hexagon socket (driven socket) 44 at the end of the threaded portion. The bolt 42 is threaded into the threaded hole 36 from one opening of the threaded hole 36 on the bottom surface of the main body 12, and the bolt head 46 extends from the main body 12 and is adjustable in position relative to the main body 12 with a hexagon wrench (driving tool) cooperating with the inner hexagon socket 44 from another opening, which communicates with the threaded hole 36, on the upper surface of the main body 12. When the sensor 10 is to be attached to the wheel rim 40 (FIG. 4), the valve rod 16 which extends from one side wall of the main body 12, passes through a valve hole of the wheel rim 40 for being fixed on the wheel rim 40 by a bolt nut (not shown). In addition, the position of the bolt 42 can be adjusted by the hexagon wrench 48 to make the bolt head 46 of the bolt 42 rest on a wheel rim platform 52 defined on the wheel rim 40 for supporting the main body 12 on the wheel rim platform 52 such that the sensor 10 can be fixedly positioned on the wheel rim 40. According to the foregoing statements, the tire-condition sensor 10 can be fixedly positioned on the wheel rim 40 by the use of the valve rod 16 and the two bolts 42.

The main body 12 of the tire-condition sensor 10 includes also two protuberances 56 at both sides of the valve rod 16. When it comes to attaching the tire-condition sensor 10 to the wheel rim 40, the tool used to insert into the tire may hit to damage the tire-condition sensor 10. Therefore, these two protuberances 56 are provided to prevent the main body 12 of the tire-condition sensor 10 from being hit directly by the maintenance tool or to act as a buffer against the bombardment. Moreover, the protuberances 56, resulting in a relatively large torque toward the main body 12, can also impede the bombardment of the maintenance tool to the ends of the main body 12.

To sum up, the tire-condition sensor of the invention has two adjustable bolts acting together with the valve rod such that the tire-condition sensor can be fixed firmly to the wheel rim platform. Moreover, the tire-condition sensor having low-profile antenna and the protuberance can prevent itself from being damaged by the maintenance tools when it comes to performing maintenance.

Although the invention has been explained in relation to its preferred embodiment, it is to be understood that many other possible variations can be made without departing from the spirit and scope of the invention as hereinafter claimed.

What is claimed is:

1. A tire-condition sensor installed on a wheel rim, which defines a wheel rim platform and a valve hole, of a tire, the tire-condition sensor comprising:
    a main body having a top surface, a bottom surface defining two threaded holes, and at least a side wall;
    a valve rod extending from the side wall and passing through the valve hole; and
    two positioning bolts adjustably extending from the two threaded holes of the main body, respectively, and resting on the wheel rim platform for fixedly supporting the main body on the wheel rim platform.

2. The tire-condition sensor of claim 1, further comprising an antenna disposed along the top surface of the main body.

3. The tire-condition sensor of claim 2, further comprising an outer lid covering the antenna and having a plurality of slots for exposing the antenna.

4. The tire-condition sensor of claim 1, wherein the main body further comprises two protective protuberances on opposite sides thereof.

5. The tire-condition sensor of claim 1, wherein
    each positioning bolt has a threaded portion and a driven socket at an end of said threaded portion; and
    the top surface of the main body defines two openings communicating with the two threaded holes, respectively, whereby each positioning bolt is adjusted with a driving tool cooperating with the driven socket through the respective opening.

6. In combination,
    a tire-condition sensor for detecting a tire condition of a pneumatic tire; and
    a wheel rim having a valve hole;
    wherein the tire-condition sensor comprises:
        a main body containing a tire-condition sensing apparatus, said main body having a top surface, a bottom surface, and at least a side wall connecting said top and bottom surfaces;
        a valve rod projecting from the side wall of said main body; and
        at least one adjustable positioning element projecting from the bottom surface of said main body an adjustable distance; and
    wherein said tire-condition sensor is installed on said wheel rim with the valve rod passing through the valve hole and the positioning element resting on the wheel rim thereby supporting the main body on the wheel rim.

7. The combination of claim 6, wherein said main body further has a hole opening to the bottom surface thereof, and the positioning element is partially received in and moveably retained by said hole.

8. The combination of claim 6, wherein said main body further has a through hole opening to both the top and bottom surfaces thereof; and the positioning element is a rod having opposite first and second end portions, the first end portion being completely received in and adjustably moveable within said through hole, the second end portion being located outside said through hole and resting on said wheel rim.

9. The combination of claim 8, wherein said first end portion has an end face that is accessible from the top surface of said main body though an upper opening of said through hole on said top surface;

said first end portion having on said end face an engaging member adapted to engage with a matching engaging member of a driving tool insertable into said through hole through said upper opening to adjustably move said rod relative to said main body.

10. The combination of claim 6, wherein said main body further has a through hole opening to both the top and bottom surfaces thereof; and the positioning element is a bolt having a shank at least partially received in said through hole and an enlarged bolt head located outside said through hole and resting on said wheel rim.

11. The combination of claim 10, wherein said through hole has a threaded section, and said shank has a threaded portion threadedly engaging with the threaded section of said through hole.

12. The combination of claim 11, wherein said shank has an end face at an end opposite to said enlarged bolt head, said end face having a socket adapted to engage with a matching driving tool for adjustably rotating and advancing said bolt relative to said main body.

13. The combination of claim 12, wherein the socket is completely located within said though hole and is accessible from the top surface of said main body though an upper opening of said through hole on said top surface.

14. The combination of claim 6, wherein said main body further has two through holes each opening to both the top and bottom surfaces and having a threaded section;

the positioning element includes two rods each having opposite first and second portions, the first portion being a threaded portion and threadedly engaging with the threaded section of one of said through holes, the second portion being located outside said through hole and resting on said wheel rim;

said first portion has an end face that is completely located within the respective through hole and accessible from the top surface of said main body though an upper opening of said through hole on said top surface; and said first portion has on said end face an engaging member adapted to engage with a matching engaging member of a driving tool insertable into said through hole through said upper opening to adjustably move said rod relative to said main body.

15. A tire-condition sensing kit, comprising:

a tire-condition sensor for detecting a tire condition of a pneumatic tire, the tire-condition sensor comprising:

a main body containing a tire-condition sensing apparatus, said main body having a top surface, a bottom surface, at least one through hole opening to both the top and bottom surfaces and having a threaded section, and at least a side wall connecting said top and bottom surfaces; and a valve rod projecting from the side wall of said main body; and a positioning element which includes at least one rod having threads engageable with the threaded section of said through hole, said rod further having opposite first and second ends, the first end being sized so as to be completely receivable within said through hole;

wherein said first end has an end face on which an engaging member adapted to engage with a matching engaging member of a driving tool is formed.

16. The kit of claim 15, further comprising said driving tool the matching engaging member of which is sized so as to be insertable into said through hole through an upper opening of said through hole on said top surface for engaging the engaging member of the rod and adjustably driving said rod to rotate and advance relative to said main body when said first end of the rod is completely received in the through hole.

17. The kit of claim 15, wherein the threads of said rod extend up to said end face.

18. The kit of claim 17, wherein said rod is a bolt having an enlarged bolt head at the second end.

19. The kit of claim 18, wherein said engaging member is a socket formed in the end face of said first end.

20. The kit of claim 19, further comprising said driving tool which is a wrench having a configuration matching that of said socket, said wrench being sized so as to be insertable into said through hole through an upper opening of said through hole on said top surface for engaging the socket of the bolt and adjustably moving said bolt relative to said main body when said first end of the bolt is completely received in the through hole;

wherein said positioning element includes two said rods and said main body has two said through holes.

\* \* \* \* \*

UNITED STATES PATENT AND TRADEMARK OFFICE
CERTIFICATE OF CORRECTION

PATENT NO.    : 6,655,203 B2
DATED         : December 2, 2003
INVENTOR(S)   : Hsu It is certified that error appears in the above-identified patent and that said Letters Patent is hereby corrected as shown below:

<u>Title page,</u>
Item [75], Inventor's name should read -- Charlie HSU --

Signed and Sealed this

Sixteenth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,655,203 B2
DATED : December 2, 2003
INVENTOR(S) : Charlie Hsu

It is certified that error appears in the above-identified patent and that said Letters Patent is hereby corrected as shown below:

Title page,
Item [73], Assignee, city should read -- Kaohsiung --

Signed and Sealed this

Sixth Day of July, 2004

JON W. DUDAS
*Acting Director of the United States Patent and Trademark Office*